United States Patent
Wolrich et al.

(10) Patent No.: US 7,149,226 B2
(45) Date of Patent: Dec. 12, 2006

(54) PROCESSING DATA PACKETS

(75) Inventors: Gilbert Wolrich, Framingham, MA (US); Mark B. Rosenbluth, Uxbridge, MA (US); Debra Bernstein, Sudbury, MA (US)

(73) Assignee: Intel Corporation, Santa Clara, CA (US)

( * ) Notice: Subject to any disclaimer, the term of this patent is extended or adjusted under 35 U.S.C. 154(b) by 976 days.

(21) Appl. No.: 10/066,297

(22) Filed: Feb. 1, 2002

(65) Prior Publication Data

US 2003/0147409 A1 Aug. 7, 2003

(51) Int. Cl.
*H04L 12/56* (2006.01)

(52) U.S. Cl. ............... 370/412; 370/423; 370/429; 709/214; 709/215; 711/118; 711/160; 711/169

(58) Field of Classification Search ............ 370/412, 370/413, 415, 417, 423, 429; 709/201, 202, 709/214, 215, 230; 711/101, 118, 154, 160, 711/169

See application file for complete search history.

(56) References Cited

U.S. PATENT DOCUMENTS

| | | |
|---|---|---|
| 3,373,408 A | 3/1968 | Ling |
| 3,478,322 A | 11/1969 | Evans |
| 3,792,441 A | 2/1974 | Wymore et al. |
| 3,940,745 A | 2/1976 | Sajeva |
| 4,130,890 A | 12/1978 | Adam |
| 4,400,770 A | 8/1983 | Chan et al. |
| 4,514,807 A | 4/1985 | Nogi |
| 4,523,272 A | 6/1985 | Fukunaga et al. |
| 4,745,544 A | 5/1988 | Renner et al. |
| 4,866,664 A | 9/1989 | Burkhardt, Jr. et al. |
| 5,140,685 A | 8/1992 | Sipple et al. |
| 5,142,683 A | 8/1992 | Burkhardt, Jr. et al. |
| 5,155,831 A | 10/1992 | Emma et al. |
| 5,155,854 A | 10/1992 | Flynn et al. |
| 5,168,555 A | 12/1992 | Byers et al. |
| 5,173,897 A | 12/1992 | Schrodi et al. |
| 5,185,861 A | 2/1993 | Valencia |
| 5,255,239 A | 10/1993 | Taborn et al. |
| 5,263,169 A | 11/1993 | Genusov et al. |
| 5,268,900 A | 12/1993 | Hluchyj et al. |
| 5,347,648 A | 9/1994 | Stamm et al. |
| 5,367,678 A | 11/1994 | Lee et al. |
| 5,390,329 A | 2/1995 | Gaertner et al. |

(Continued)

FOREIGN PATENT DOCUMENTS

EP  0 379 709  8/1990

(Continued)

OTHER PUBLICATIONS

U.S. Appl. No. 09/475,614, filed Dec. 30, 1999, Wolrich et al.

(Continued)

*Primary Examiner*—Ricky Q. Ngo
*Assistant Examiner*—Shick Hom
(74) *Attorney, Agent, or Firm*—Fish & Richardson P.C.

(57) ABSTRACT

A method and apparatus for processing data packets including generating an enqueue command specifying a queue descriptor associated with a new buffer. The queue descriptor is part of a cache of queue descriptors each having a head pointer pointing to a first buffer in a queue of buffers, and a tail pointer pointing to a last buffer in the queue. The first buffer having a buffer pointer pointing to next buffer in the queue. The buffer pointer associated with the last buffer and the tail pointer is set to point to the new buffer.

22 Claims, 7 Drawing Sheets

U.S. PATENT DOCUMENTS

| | | | |
|---|---|---|---|
| 5,392,391 A | 2/1995 | Caulk, Jr. et al. | |
| 5,392,411 A | 2/1995 | Ozaki | |
| 5,392,412 A * | 2/1995 | McKenna | 710/52 |
| 5,404,464 A | 4/1995 | Bennett | |
| 5,404,482 A | 4/1995 | Stamm et al. | |
| 5,432,918 A | 7/1995 | Stamm | |
| 5,448,702 A * | 9/1995 | Garcia et al. | 710/100 |
| 5,450,351 A | 9/1995 | Heddes | |
| 5,452,437 A | 9/1995 | Richey et al. | |
| 5,459,842 A | 10/1995 | Begun et al. | |
| 5,463,625 A | 10/1995 | Yasrebi | |
| 5,467,452 A | 11/1995 | Blum et al. | |
| 5,517,648 A | 5/1996 | Bertone et al. | |
| 5,542,070 A | 7/1996 | LeBlanc et al. | |
| 5,542,088 A | 7/1996 | Jennings, Jr. et al. | |
| 5,544,236 A | 8/1996 | Andruska et al. | |
| 5,550,816 A | 8/1996 | Hardwick et al. | |
| 5,557,766 A | 9/1996 | Takiguchi et al. | |
| 5,568,617 A | 10/1996 | Kametani | |
| 5,574,922 A | 11/1996 | James | |
| 5,592,622 A | 1/1997 | Isfeld et al. | |
| 5,613,071 A | 3/1997 | Rankin et al. | |
| 5,613,136 A | 3/1997 | Casavant et al. | |
| 5,623,489 A | 4/1997 | Cotton et al. | |
| 5,627,829 A | 5/1997 | Gleeson et al. | |
| 5,630,130 A | 5/1997 | Perotto et al. | |
| 5,634,015 A | 5/1997 | Chang et al. | |
| 5,644,623 A | 7/1997 | Gulledge | |
| 5,649,092 A | 7/1997 | Price et al. | 714/15 |
| 5,649,157 A | 7/1997 | Williams | |
| 5,659,687 A | 8/1997 | Kim et al. | |
| 5,671,446 A | 9/1997 | Rakity et al. | |
| 5,680,641 A | 10/1997 | Sidman | |
| 5,684,962 A | 11/1997 | Black et al. | |
| 5,689,566 A | 11/1997 | Nguyen | |
| 5,699,537 A | 12/1997 | Sharangpani et al. | |
| 5,717,898 A | 2/1998 | Kagan et al. | |
| 5,721,870 A | 2/1998 | Matsumoto | |
| 5,742,587 A | 4/1998 | Zornig et al. | |
| 5,742,782 A | 4/1998 | Ito et al. | |
| 5,742,822 A | 4/1998 | Motomura | |
| 5,745,913 A | 4/1998 | Pattin et al. | |
| 5,751,987 A | 5/1998 | Mahant Shetti et al. | |
| 5,761,507 A | 6/1998 | Govett | |
| 5,761,522 A | 6/1998 | Hisanaga et al. | |
| 5,781,774 A | 7/1998 | Krick | |
| 5,784,649 A | 7/1998 | Begur et al. | |
| 5,784,712 A | 7/1998 | Byers et al. | |
| 5,796,413 A | 8/1998 | Shipp et al. | |
| 5,797,043 A | 8/1998 | Lewis et al. | |
| 5,809,235 A | 9/1998 | Sharma et al. | |
| 5,809,530 A | 9/1998 | Samra et al. | |
| 5,812,868 A | 9/1998 | Moyer et al. | |
| 5,828,746 A | 10/1998 | Ardon | |
| 5,828,863 A | 10/1998 | Barrett et al. | |
| 5,832,215 A | 11/1998 | Kato et al. | |
| 5,835,755 A | 11/1998 | Stellwagen, Jr. | |
| 5,850,395 A | 12/1998 | Hauser et al. | |
| 5,854,922 A | 12/1998 | Gravenstein et al. | |
| 5,860,158 A | 1/1999 | Pai et al. | |
| 5,872,769 A | 2/1999 | Caldara et al. | |
| 5,873,089 A | 2/1999 | Regache | |
| 5,886,992 A | 3/1999 | Raatikainen et al. | |
| 5,887,134 A | 3/1999 | Ebrahim | |
| 5,890,208 A | 3/1999 | Kwon | |
| 5,892,979 A | 4/1999 | Shiraki et al. | |
| 5,893,162 A | 4/1999 | Lau et al. | |
| 5,905,876 A | 5/1999 | Pawlowski et al. | |
| 5,905,889 A | 5/1999 | Wilhelm, Jr. | |
| 5,915,123 A | 6/1999 | Mirsky et al. | |
| 5,937,187 A | 8/1999 | Kosche et al. | |
| 5,938,736 A | 8/1999 | Muller et al. | |
| 5,940,612 A | 8/1999 | Brady et al. | |
| 5,940,866 A | 8/1999 | Chisholm et al. | |
| 5,946,487 A | 8/1999 | Dangelo | |
| 5,948,081 A | 9/1999 | Foster | |
| 5,958,031 A | 9/1999 | Kim | |
| 5,961,628 A | 10/1999 | Nguyen et al. | |
| 5,970,013 A | 10/1999 | Fischer et al. | |
| 5,974,518 A | 10/1999 | Nogradi | |
| 5,978,838 A | 11/1999 | Mohamed et al. | |
| 5,983,274 A | 11/1999 | Hyder et al. | |
| 6,012,151 A | 1/2000 | Mano | |
| 6,014,729 A | 1/2000 | Lannan et al. | |
| 6,023,742 A | 2/2000 | Ebeling et al. | |
| 6,058,168 A | 5/2000 | Braband | |
| 6,067,585 A | 5/2000 | Hoang | |
| 6,070,231 A | 5/2000 | Ottinger | |
| 6,072,781 A | 6/2000 | Feeney et al. | |
| 6,073,215 A | 6/2000 | Snyder | |
| 6,079,008 A | 6/2000 | Clery, III | |
| 6,085,215 A | 7/2000 | Ramakrishnan et al. | |
| 6,085,294 A | 7/2000 | Van Doren et al. | |
| 6,092,127 A | 7/2000 | Tausheck | |
| 6,092,158 A | 7/2000 | Harriman et al. | |
| 6,112,016 A | 8/2000 | MacWilliams et al. | |
| 6,134,665 A | 10/2000 | Klein et al. | |
| 6,141,689 A | 10/2000 | Yasrebi | |
| 6,141,765 A | 10/2000 | Sherman | |
| 6,144,669 A | 11/2000 | Williams et al. | |
| 6,145,054 A | 11/2000 | Mehrotra et al. | |
| 6,157,955 A | 12/2000 | Narad et al. | |
| 6,160,562 A | 12/2000 | Chin et al. | |
| 6,182,177 B1 | 1/2001 | Harriman | |
| 6,195,676 B1 | 2/2001 | Spix et al. | |
| 6,199,133 B1 | 3/2001 | Schnell | |
| 6,201,807 B1 | 3/2001 | Prasanna | |
| 6,212,542 B1 | 4/2001 | Kahle et al. | |
| 6,212,611 B1 | 4/2001 | Nizar et al. | |
| 6,216,220 B1 | 4/2001 | Hwang | |
| 6,223,207 B1 | 4/2001 | Lucovsky et al. | |
| 6,223,238 B1 | 4/2001 | Meyer et al. | |
| 6,223,279 B1 | 4/2001 | Nishimura et al. | |
| 6,247,025 B1 | 6/2001 | Bacon | |
| 6,256,713 B1 | 7/2001 | Audityan et al. | |
| 6,272,616 B1 | 8/2001 | Fernando et al. | |
| 6,275,505 B1 * | 8/2001 | O'Loughlin et al. | 370/473 |
| 6,279,113 B1 | 8/2001 | Vaidya | |
| 6,289,011 B1 | 9/2001 | Seo et al. | |
| 6,298,370 B1 | 10/2001 | Tang et al. | |
| 6,307,789 B1 | 10/2001 | Wolrich et al. | |
| 6,320,861 B1 | 11/2001 | Adam et al. | |
| 6,324,624 B1 | 11/2001 | Wolrich et al. | |
| 6,345,334 B1 | 2/2002 | Nakagawa et al. | |
| 6,347,341 B1 | 2/2002 | Glassen et al. | |
| 6,347,344 B1 | 2/2002 | Baker et al. | |
| 6,351,474 B1 | 2/2002 | Robinett et al. | |
| 6,356,962 B1 | 3/2002 | Kasper et al. | |
| 6,359,911 B1 | 3/2002 | Movshovich et al. | |
| 6,360,262 B1 | 3/2002 | Guenthner et al. | |
| 6,373,848 B1 | 4/2002 | Allison et al. | |
| 6,385,658 B1 * | 5/2002 | Harter et al. | 719/312 |
| 6,389,449 B1 | 5/2002 | Nemirovsky et al. | |
| 6,393,483 B1 | 5/2002 | Latif et al. | |
| 6,393,531 B1 | 5/2002 | Novak et al. | |
| 6,415,338 B1 | 7/2002 | Habot | |
| 6,426,940 B1 | 7/2002 | Seo et al. | |
| 6,426,957 B1 | 7/2002 | Hauser et al. | |
| 6,427,196 B1 | 7/2002 | Adiletta et al. | |
| 6,430,626 B1 | 8/2002 | Witkowski et al. | |
| 6,434,145 B1 | 8/2002 | Opsasnick et al. | |
| 6,438,651 B1 | 8/2002 | Slane | |
| 6,463,072 B1 | 10/2002 | Wolrich et al. | |
| 6,522,188 B1 | 2/2003 | Poole | |

| | | | |
|---|---|---|---|
| 6,523,060 B1 * | 2/2003 | Kao ........................... 709/202 |
| 6,532,509 B1 | 3/2003 | Wolrich et al. |
| 6,539,024 B1 | 3/2003 | Janoska et al. |
| 6,552,826 B1 | 4/2003 | Adler et al. |
| 6,560,667 B1 | 5/2003 | Wolrich et al. |
| 6,577,542 B1 | 6/2003 | Wolrich et al. |
| 6,584,522 B1 | 6/2003 | Wolrich et al. |
| 6,587,906 B1 | 7/2003 | Wolrich et al. |
| 6,606,704 B1 | 8/2003 | Adiletta et al. |
| 6,625,654 B1 | 9/2003 | Wolrich et al. |
| 6,631,430 B1 | 10/2003 | Wolrich et al. |
| 6,631,462 B1 | 10/2003 | Wolrich et al. |
| 6,658,546 B1 | 12/2003 | Calvignac et al. |
| 6,661,794 B1 | 12/2003 | Wolrich et al. |
| 6,667,920 B1 | 12/2003 | Wolrich et al. |
| 6,668,317 B1 | 12/2003 | Bernstein et al. |
| 6,681,300 B1 | 1/2004 | Wolrich et al. |
| 6,684,303 B1 | 1/2004 | LaBerge |
| 6,687,247 B1 | 2/2004 | Wilford et al. |
| 6,694,380 B1 | 2/2004 | Wolrich et al. |
| 6,724,721 B1 | 4/2004 | Cheriton |
| 6,728,845 B1 | 4/2004 | Adiletta et al. |
| 6,731,596 B1 | 5/2004 | Chiang et al. |
| 6,754,223 B1 | 6/2004 | Lussier et al. |
| 6,757,791 B1 | 6/2004 | O'Grady et al. |
| 6,768,717 B1 | 7/2004 | Reynolds et al. |
| 6,779,084 B1 | 8/2004 | Wolrich et al. |
| 6,791,989 B1 | 9/2004 | Steinmetz et al. |
| 6,795,447 B1 | 9/2004 | Kadambi et al. |
| 6,804,239 B1 | 10/2004 | Lussier et al. |
| 6,810,426 B1 | 10/2004 | Mysore et al. |
| 6,813,249 B1 | 11/2004 | Lauffenburger et al. |
| 6,816,498 B1 | 11/2004 | Viswanath |
| 6,822,958 B1 | 11/2004 | Branth et al. |
| 6,822,959 B1 | 11/2004 | Galbi et al. |
| 6,842,457 B1 | 1/2005 | Malalur |
| 6,850,999 B1 | 2/2005 | Mak et al. |
| 6,868,087 B1 | 3/2005 | Agarwala et al. |
| 6,888,830 B1 | 5/2005 | Snyder II et al. |
| 6,975,637 B1 * | 12/2005 | Lenell ........................ 370/412 |
| 2001/0014100 A1 | 8/2001 | Abe et al. |
| 2002/0131443 A1 | 9/2002 | Robinett et al. |
| 2002/0144006 A1 | 10/2002 | Cranston et al. |
| 2002/0196778 A1 | 12/2002 | Colmant et al. |
| 2003/0041216 A1 | 2/2003 | Rosenbluth et al. |
| 2003/0046488 A1 | 3/2003 | Rosenbluth et al. |
| 2003/0110166 A1 | 6/2003 | Wolrich et al. |
| 2003/0115347 A1 | 6/2003 | Wolrich et al. |
| 2003/0115426 A1 | 6/2003 | Rosenbluth et al. |
| 2003/0131022 A1 | 7/2003 | Wolrich et al. |
| 2003/0131198 A1 | 7/2003 | Wolrich et al. |
| 2003/0140196 A1 | 7/2003 | Wolrich et al. |
| 2003/0147409 A1 | 8/2003 | Wolrich et al. |
| 2004/0039895 A1 | 2/2004 | Wolrich et al. |
| 2004/0054880 A1 | 3/2004 | Bernstein et al. |
| 2004/0071152 A1 | 4/2004 | Wolrich et al. |
| 2004/0073728 A1 | 4/2004 | Wolrich et al. |
| 2004/0073778 A1 | 4/2004 | Adiletta et al. |
| 2004/0098496 A1 | 5/2004 | Wolrich et al. |
| 2004/0109369 A1 | 6/2004 | Wolrich et al. |
| 2004/0179533 A1 | 9/2004 | Donovan |

FOREIGN PATENT DOCUMENTS

| | | |
|---|---|---|
| EP | 0 418 447 | 3/1991 |
| EP | 0 464 715 | 1/1992 |
| EP | 0 633 678 | 1/1995 |
| EP | 0 745 933 | 12/1996 |
| EP | 0 760 501 | 3/1997 |
| EP | 0 809 180 | 11/1997 |
| JP | 59111533 | 6/1984 |
| WO | WO 94/15287 | 7/1994 |
| WO | WO 97/38372 | 10/1997 |
| WO | WO 98/25210 | 6/1998 |
| WO | WO 01/15718 | 3/2001 |
| WO | WO 01/16769 | 3/2001 |
| WO | WO 01/16770 | 3/2001 |
| WO | WO 01/16782 | 3/2001 |
| WO | WO 01/48596 | 7/2001 |
| WO | WO 01/48606 | 7/2001 |
| WO | WO 01/48619 | 7/2001 |
| WO | WO 01/50247 | 7/2001 |
| WO | WO 01/50679 | 7/2001 |
| WO | WO 03/017541 | 2/2003 |

OTHER PUBLICATIONS

U.S. Appl. No. 09/473,571, filed Dec. 28, 1999, Wolrich et al.

Byrd et al., "Multithread Processor Architectures," *IEEE Spectrum*, vol. 32, No. 8, New York, Aug. 1, 1995, pp. 38-46.

Doyle et al., *Microsoft Press Computer Dictionary*, 2$^{nd}$ ed., Microsoft Press, Redmond, Washington, USA, 1994, p. 326.

Fillo et al., "The M-Machine Multicomputer," IEEE Proceedings of MICRO-28, 1995, pp. 146-156.

Gomez et al., "Efficient Multithreaded User-Space Transport for Network Computing: Design and Test of the TRAP Protocol," *Journal of Parallel and Distributed Computing*, Academic Press, Duluth, Minnesota, USA, vol. 40, No. 1, Jan. 10, 1997, pp. 103-117.

Haug et al., "Reconfigurable hardware as shared resource for parallel threads," IEEE Symposium on FPGAs for Custom Computing Machines, 1998.

Hauser et al., "Garp: a MIPS processor with a reconfigurable coprocessor," Proceedings of the 5$^{th}$ Annual IEEE Symposium on Field-Programmable Custom Computing Machines, 1997.

Hyde, R., "Overview of Memory Management," *Byte*, vol. 13, No. 4, 1998, pp. 219-225.

Litch et al., "StrongARMing Portable Communications," IEEE Micro, 1998, pp. 48-55.

Schmidt et al., "The Performance of Alternative Threading Architectures for Parallel Communication Subsystems," Internet Document, *Online!*, Nov. 13, 1998.

Thistle et al., "A Processor Architecture for Horizon," IEEE, 1998, pp. 35-41.

Tremblay et al., "A Three Dimensional Register File for Superscalar Processors," IEEE Proceedings of the 28$^{th}$ Annual Hawaii International Conference on System Sciences, 1995, pp. 191-201.

Trimberger et al, "A time-multiplexed FPGA," Proceedings of the 5$^{th}$ Annual IEEE Symposium on Field-Programmable Custom Computing Machines, 1998.

Turner eet al., "Design of a High Performance Active Router," Internet Document, *Online*, Mar. 18, 1999.

Vibhatavanjit et al., "Simultaneous Multithreading-Based Routers," Proceedings of the 2000 International Conference of Parallel Processing, Toronto, Ontario, Canada, Aug. 21-24, 2000, pp. 362-359.

Wazlowski et al., "PRSIM-II computer and architecture," IEEE Proceedings, Workshop on FPGAs for Custom Computing Machines, 1993.

Adiletta, et al., "The next generation of Intel IXP Network Processors", Intel Technology Journal, Network Processors, vol. 6, issue 3, published Aug. 15, 2002, pp. 6-18.

Brewer, et al., "Remote Queues: Exposing Message Queues for Optimization and Atomicity", SPAA '95 Santa Barbara, CA, pp. 1-13.

Buyuktosunoglu, A., et al., "Tradeoffs in Power-Efficient Issue Queue Design", ISLPED '02, ACM, Aug. 2002, 6 pages.

Dandamudi, D., "Multiprocessors", IEEE Computer, Mar. 1997, pp. 82-89.

Hendler, D., et al., "Work Dealing", SPAA '02, ACM, Aug. 2002, pp. 164-172.

Jonkers, H., "Queueing Models of Shared-Memory Parallel Applications", Computer and Telecommunications Systems Performance Engineering, Pentech Press, London, 1994, 13 pages.

Kornaros, et al., "A Fully-Programmable Memory Management System Optimizing Queue Handling at Multi Gigabit Rates", ACM, Jun. 2-6, 2003, pp. 54-59.

Kumar, S., et al., "A Scalable, Cache-Based Queue Management Subsystem for Network Processors", no date, pp. 1-7.

Lymar, T., et al., "Data Streams Organization in Query Executor for Parallel DBMS", no date, 4 pages.

McLuckie, L., et al., "Using the RapidIO Messaging Unit on PowerQUICC III", Freescale Semiconductor, Inc., 2004 Rev. 1, pp. 1-19.

Michael, M., "Scalable Lock-Free Dynamic Memory Allocation", PLDI '04, ACM, Jun. 2004, pp. 1-12.

Pan, H., et al., "Heads and Tails: A Variable-Length Instruction Format Supporting Parallel Fetch and Decode", CASES 01, No. 16-17, 2001, 8 pages.

Scott, M., "Non-Blocking Timeout in Scalable Queue-Based Spin Locks", PODC '02, ACM, Jul. 2002, pp. 31-40.

* cited by examiner

PROCESSING DATA PACKETS

BACKGROUND

This invention relates to processing of network packets.

Current store and forward network devices such as routers and switches are expected to be capable of processing data packets at increased line speeds of 10 Gigabits and higher. For minimum sized packets, the network device should be able to store newly received data packets to a memory structure at a rate at least equal to the arrival time of the packets. In addition, in order to maintain system throughput without dropping data packets, packets should be removed from the memory and transmitted at the packet arrival rate.

DETAILED DESCRIPTION

Figure 1:
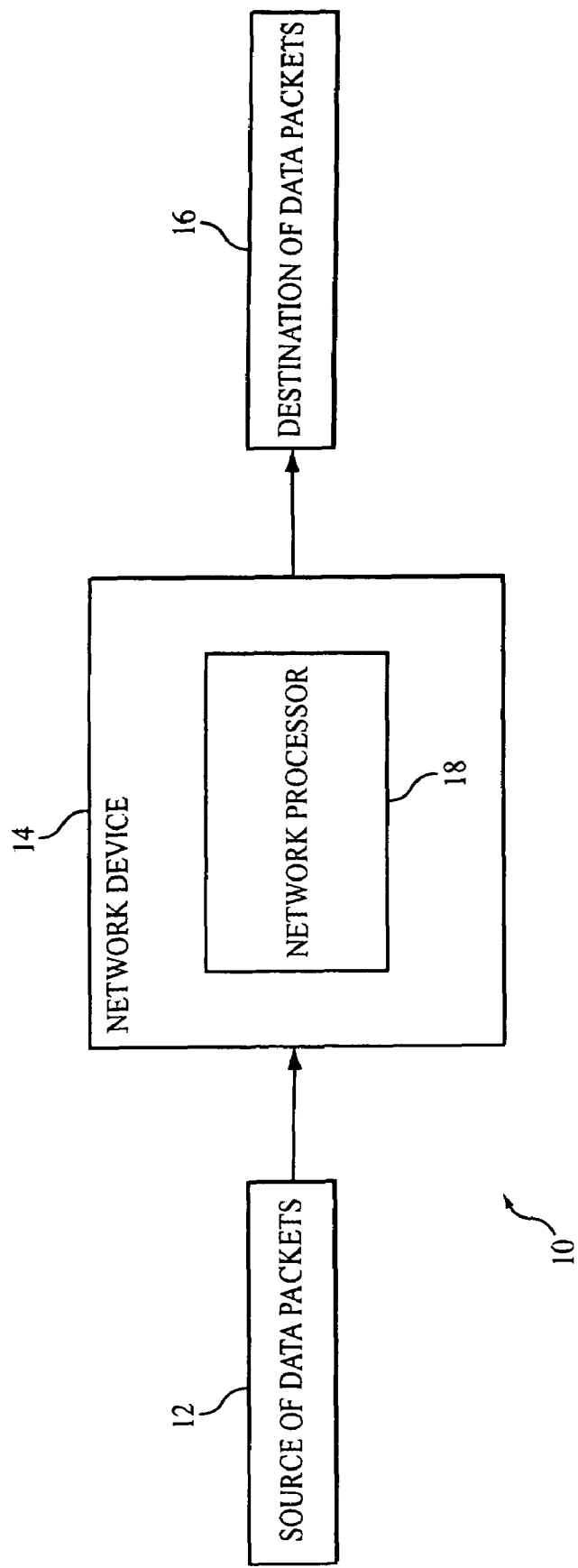
FIG. 1 is a block diagram of a network system.

Referring to FIG. 1, a network system 10 for processing data packets includes a source of data packets 12 coupled to an input of a network device 14. An output of the network device is coupled to a destination of data packets 16. The network device 14 can include a network processor 18 with memory data structures configured to store and forward the data packets to a specified destination. Such a network device 14 can include a network switch, a network router, or other network device. The source of data packets 12 can include other network devices 14 connected over a communications path operating at high data packet transfer line speeds such as an optical carrier (OC)-192 line, 10 Gigabit line, or other line speeds. Likewise, the destination of data packets 16 can include a similar network connection.

Figure 2:
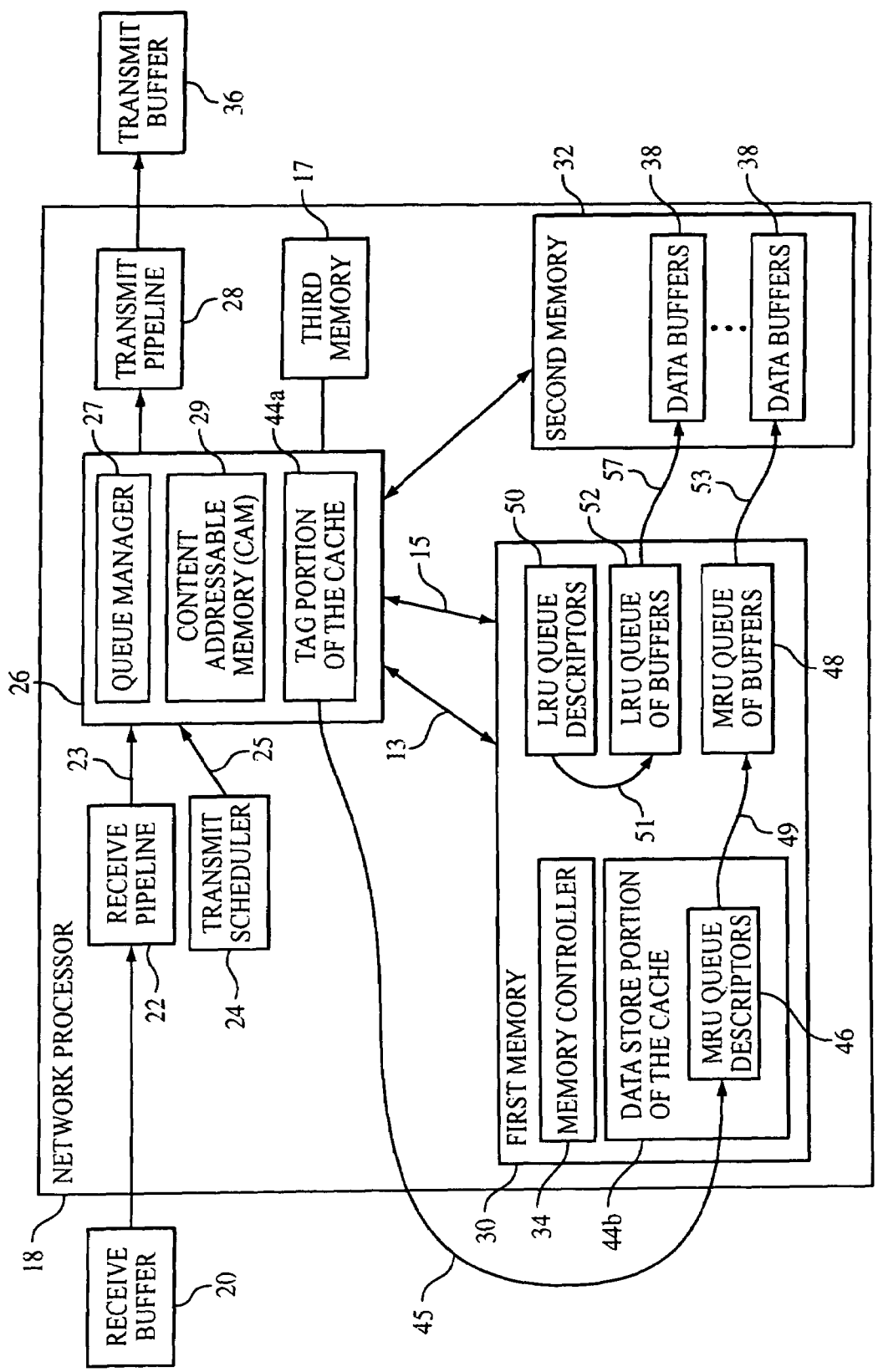
FIG. 2 is a block diagram of a network processor.

Referring to FIG. 2, the network processor 18 includes a processor 26 coupled to a first memory 30, a second memory 32, and a third memory 17. The third memory 17 has software instructions for managing the operation of the network processor 18. However, the instructions also can be stored in the first memory 30, the second memory 32, or a combination of the two memories. The processor 26 includes a queue manager 27 containing software components configured to manage a cache of queue descriptors ("the cache") having a tag portion 44a and a data store portion 44b. The tag portion 44a of the cache 44 resides in the processor 26, whereas the data store portion 44b of the cache resides in the first memory 30. The tag portion 44a is managed by a content addressable memory (CAN) module 29 which can include hardware components configured to implement a cache entry replacement policy such as a least recently used (LRU) policy.

The data store portion 44b maintains a certain number of the most recently used (MRU) queue descriptors 46, each of which includes pointers 49 to a corresponding MRU queue of buffer descriptors 48, hereinafter, referred to as a MRU queue of buffers 48. In one implementation, the maximum number of MRU queue descriptors 46 in the data store portion 44b is sixteen. Each MRU queue descriptor 46 is referenced by a set of pointers 45 residing in the tag portion 44a. In addition, each MRU queue descriptor 46 is associated with a unique identifier so that it can be identified easily.

Each MRU queue of buffers 48 stores pointers 53 to data buffers 38 residing in the second memory 32. In another embodiment, each MRU queue of buffers 48 can refer to the data buffers 38 by mapping to the data buffers. In one implementation, each queue of buffers 48 can be a linked list of buffers. Each data buffer 38 can store multiple data packets as provided from a receive buffer 20.

Least recently used (LRU) queue descriptors 50, which are not currently referenced by the data store portion 44b, reside in the first memory 30. Each LRU queue descriptor 50 also is associated with a unique identifier and includes pointers 51 to a corresponding LRU queue of buffers 52. Each LRU queue of buffers 52 contains pointers 57 to the data buffers 38 residing in the second memory 32.

The first memory 30 can include fast access memory such as static random access memory (SRAM). The processor 26 is coupled to the first memory 30 that has a space for storing data and memory controller logic 34 to handle queue commands and exchange data with the processor. The second memory 32 is coupled to the processor 26 as well as other components of the network processor 18. The second memory 32 can include dynamic random access memory (DRAM) that generally has a slower access time than SRAM but may provide fast burst mode access to the data buffers 38. Alternatively, the first memory 30 and/or the second memory 32 can reside externally to the network processor 18.

The receive buffer 20 is coupled to the processor 26 through a receive pipeline 22 and is configured to buffer data packets received from the source of data packets 12 (see FIG. 1). Each data packet can contain a real data portion, a source data portion representing the network address of the source of the data and a destination data portion representing the destination network address where the data packet is to be delivered.

The receive pipeline 22 can include multiple processors using pipelining and multi-threading techniques to process the data packets. The receive pipeline 22 processes the data packets from the receive buffer 20 and stores the data packets in a data buffer 38. In addition, the receive pipeline 22 determines which queue is associated with the data buffer 38. The CAM module 29 is responsible for determining whether the data buffer 38 is associated with a MRU queue 48 and a corresponding MRU queue descriptor 46 or with a LRU queue 52 and a corresponding LRU queue descriptor 50.

Once the data packets are processed, the receive pipeline 22 generates enqueue requests 23 directed to the processor 26. Each enqueue request 23 represents a request to append a newly received buffer to the last buffer in the queue 48. The receive pipeline 22 can buffer a certain number of packets before generating each enqueue request 23. Consequently, the number of enqueue requests 23 are reduced because enqueue requests are not generated until a specified number of packets have arrived. An enqueue request 23 includes an address pointing to a queue descriptor of the queue of buffers 48a which further refers to a data buffer 38 associated with the received data packets. In addition, each enqueue request 23 includes an identifier specifying either a LRU queue descriptor 50 or a MRU queue descriptor 46 associated with the data buffer 38.

The processor 26 processes each enqueue request 23 and, in response, generates an enqueue command 13 directed to the memory controller 34. The enqueue command 13 may include a queue identifier specifying a MRU queue descriptor 46 residing in the data store portion 44b. The MRU queue descriptor 46 includes a pointer 49 to a corresponding queue

48. The queue 48 is updated to point to the data buffer 38 that has the received data packet. In addition, the MRU queue descriptor 46 is updated to reflect the updated state of the MRU queue 48. The MRU queue descriptor 46 can be updated in a fast and efficient manner because the queue descriptor already is in the data store portion 44*b*.

On the other hand, the enqueue command 13 may include a queue identifier specifying a LRU queue descriptor 50 that points 51 to a LRU queue 52. In that case, the queue manager 27 replaces a particular MRU queue descriptor 46 with the LRU queue descriptor 50. As a result, the LRU queue descriptor 50 and the corresponding LRU queue 52 are referenced by the data store portion 44*b*. In addition, the newly referenced LRU queue 52 associated with the LRU queue descriptor 50 is updated to point to the data buffer 38 containing the received data packet.

A transmit scheduler 24 is coupled to the processor 26 and is responsible for generating dequeue requests 25 based on criteria such as when the number of buffers in a particular queue reaches a predetermined level. Each dequeue request 25 represents a request to remove the first buffer from the queue 48. The transmit scheduler 24 also may include scheduling algorithms for generating dequeue requests 25 such as "round robin", priority based, or other scheduling algorithms. The transmit scheduler 24 also can be configured to use congestion avoidance techniques such as random early detection (RED) which involves calculating statistics for the packet traffic. The processor 26 generates dequeue commands 15 directed to the memory controller 34 in response to receiving dequeue requests 25. The processor 26 can include a programming engine having a multiple context architecture such that each context can be assigned a queue of buffers. In one implementation, the processor 26 has a ring data structure for handling enqueue requests 23 and dequeue requests 25.

Similar to the enqueue command discussed above, each dequeue command 15 may include a queue identifier specifying a queue descriptor such as a MRU queue descriptor 46 that points to a MRU queue 48. As discussed above, the MRU queue 48 includes pointers 53 to data buffers 38. The data in the buffers 38 referenced by the pointer 53 is returned to the processor 26 for further processing. As a result, the queue 48 is updated and no longer points to the returned data buffer 38 since it is no longer referenced by the data store portion 44*b*.

On the other hand, the dequeue command 15 may include a LRU queue descriptor 50 that points to a LRU queue 52. In that case, which is similar to the queue command 13 discussed above, the queue manager 27 replaces a particular MRU queue descriptor with the LRU queue descriptor. This includes performing a "write back" operation in which the replaced queue descriptor is written back to the first memory 30. As a result, the replacement MRU queue descriptor 46 and the corresponding MRU queue buffer 48 are referenced by the data store portion 44*b*. The data buffer 38 that was pointed to by the queue 48 is returned to the processor 26 for further processing. As a result, the queue buffer 48 is updated and no longer points to the data buffer 38 since it is no longer referenced by the data store portion 44*b*.

The processor 26 is coupled to a transmit pipeline 28 which is responsible for handling the data buffers 38 for transmission to a transmit buffer 36. The transmit pipeline 28 may include multi-threading and pipelining techniques to process the data buffers. For example, each thread may be assigned to a particular queue of buffers, thereby allowing multiple queues to be processed in parallel.

The transmit buffer 36 is coupled to the transmit pipeline 28 and is responsible for buffering the data buffers 38 received from the transmit pipeline.

Figure 3:
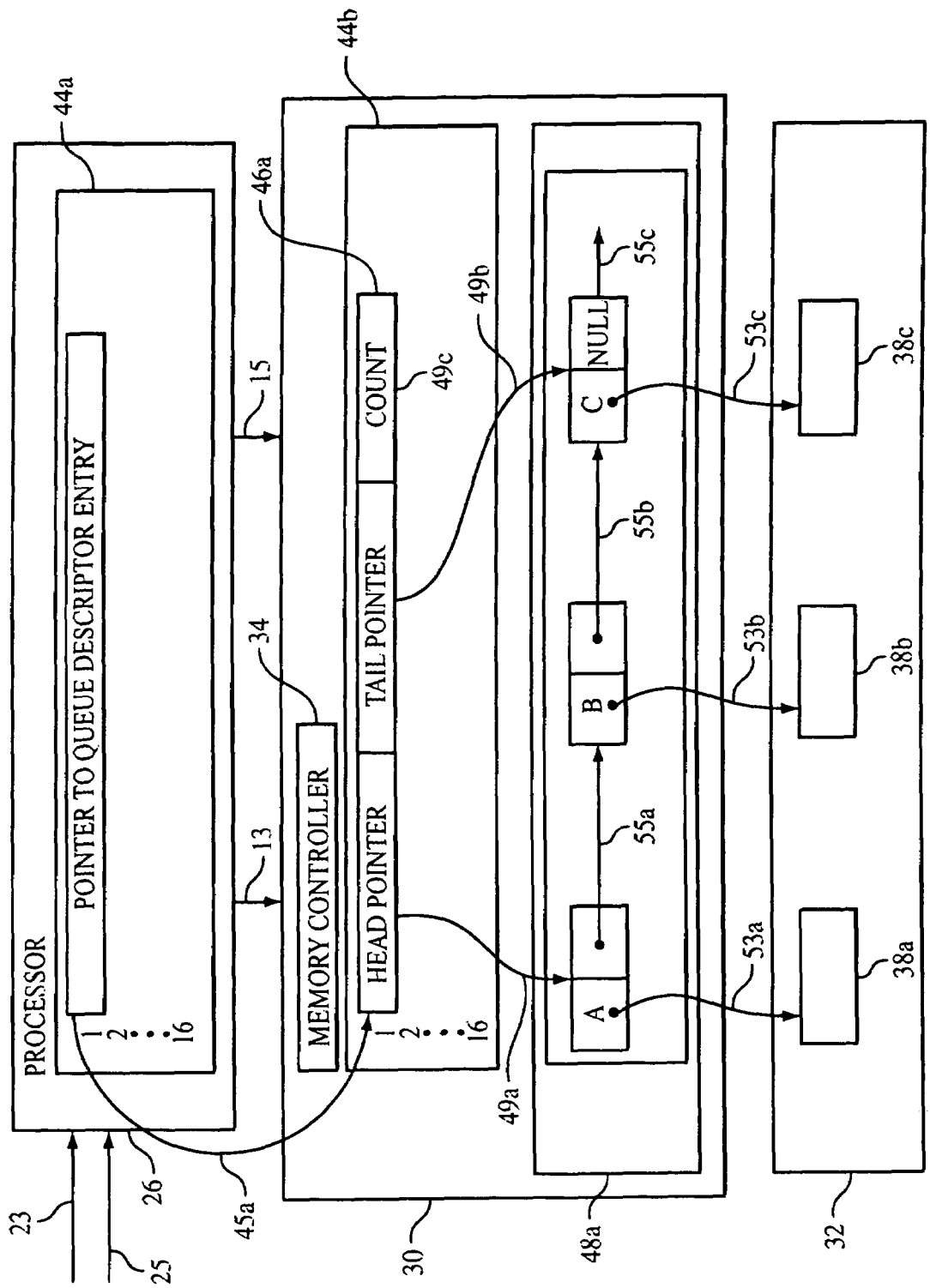
FIG. 3 is a block diagram of a cache data structure that illustrates enqueue and dequeue operations.

Referring to FIG. 3, the operation of the cache 44 is shown. The tag portion 44*a* can include 16 entries containing pointers 45 to a corresponding queue descriptor 46 in the data store portion 44*b*. For purposes of illustration only, the following discussion focuses on the first entry 1 in the tag portion 44*a*. The first entry 1 is associated with a pointer 45*a* pointing to a MRU queue descriptor 46*a* residing in the data store portion 44*b*. The queue descriptor 46*a* is associated with a MRU queue 48*a*. Each buffer, such as a first buffer A, includes a pointer 53*a* to a respective data buffer 38*a* in the second memory 32. In addition, each buffer, includes a buffer pointer 55*a* pointing to a subsequent ordered buffer B. It should be noted that buffer pointer 55*c* associated with a last buffer C has a value set to NULL to indicate that it is the last buffer in the queue 48*a*.

The queue descriptor 46*a* includes a head pointer 49*a* pointing to the first buffer A and a tail pointer 49*b* pointing to the last buffer C. An optional count field 49*c* maintains the number of buffers in the queue 48*a*. In the illustrated example, the count field 49*c* is set to the value 3 representing the buffers A to C. As discussed in further detail below, the head pointer 49*a*, the tail pointer 49*b* and the count field 49*c* may be modified in response to enqueue requests 23 and dequeue requests 25.

Figure 4A:
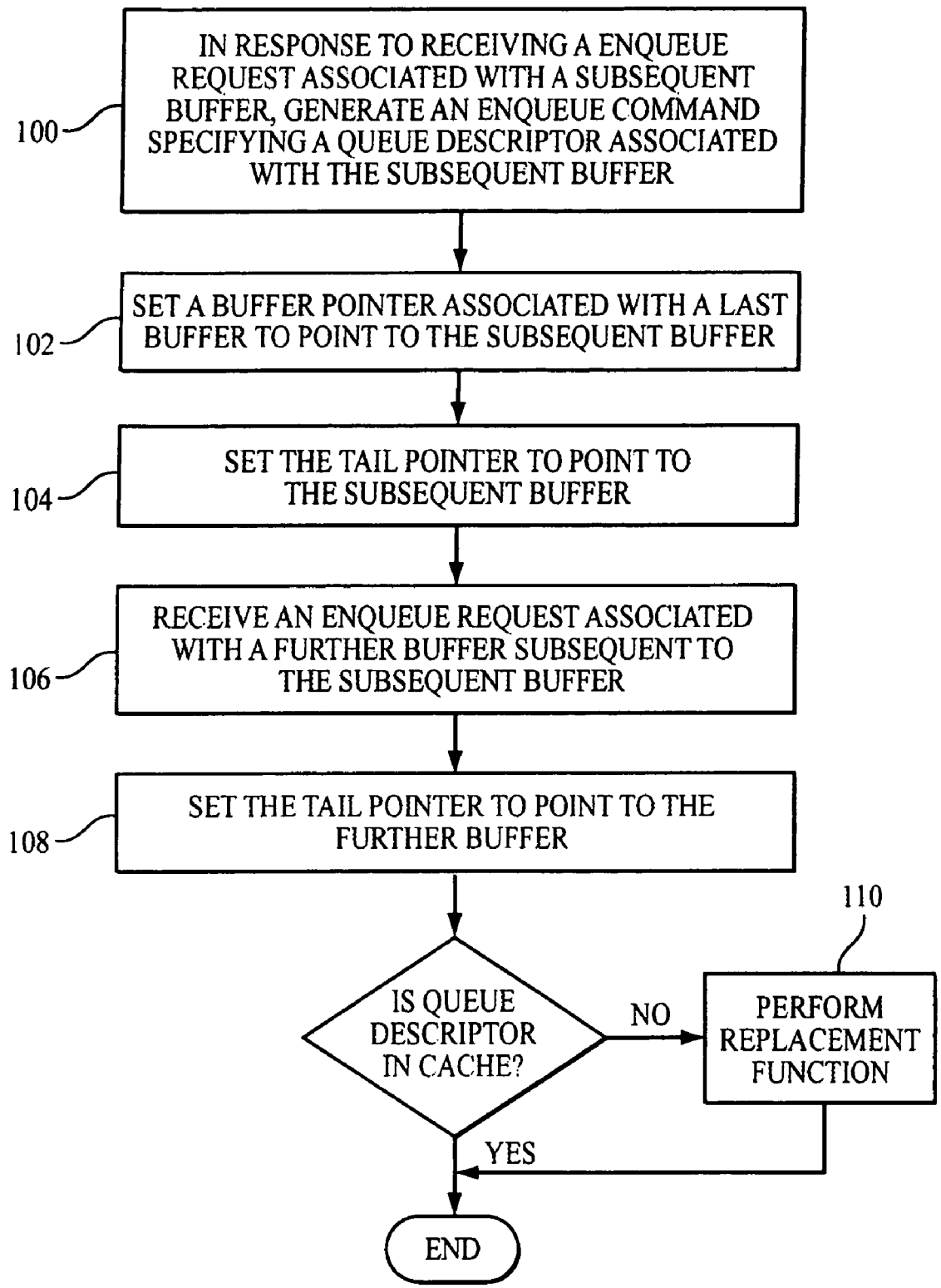
FIGS. 4A and 4B illustrate an enqueue operation.
Figure 4B:
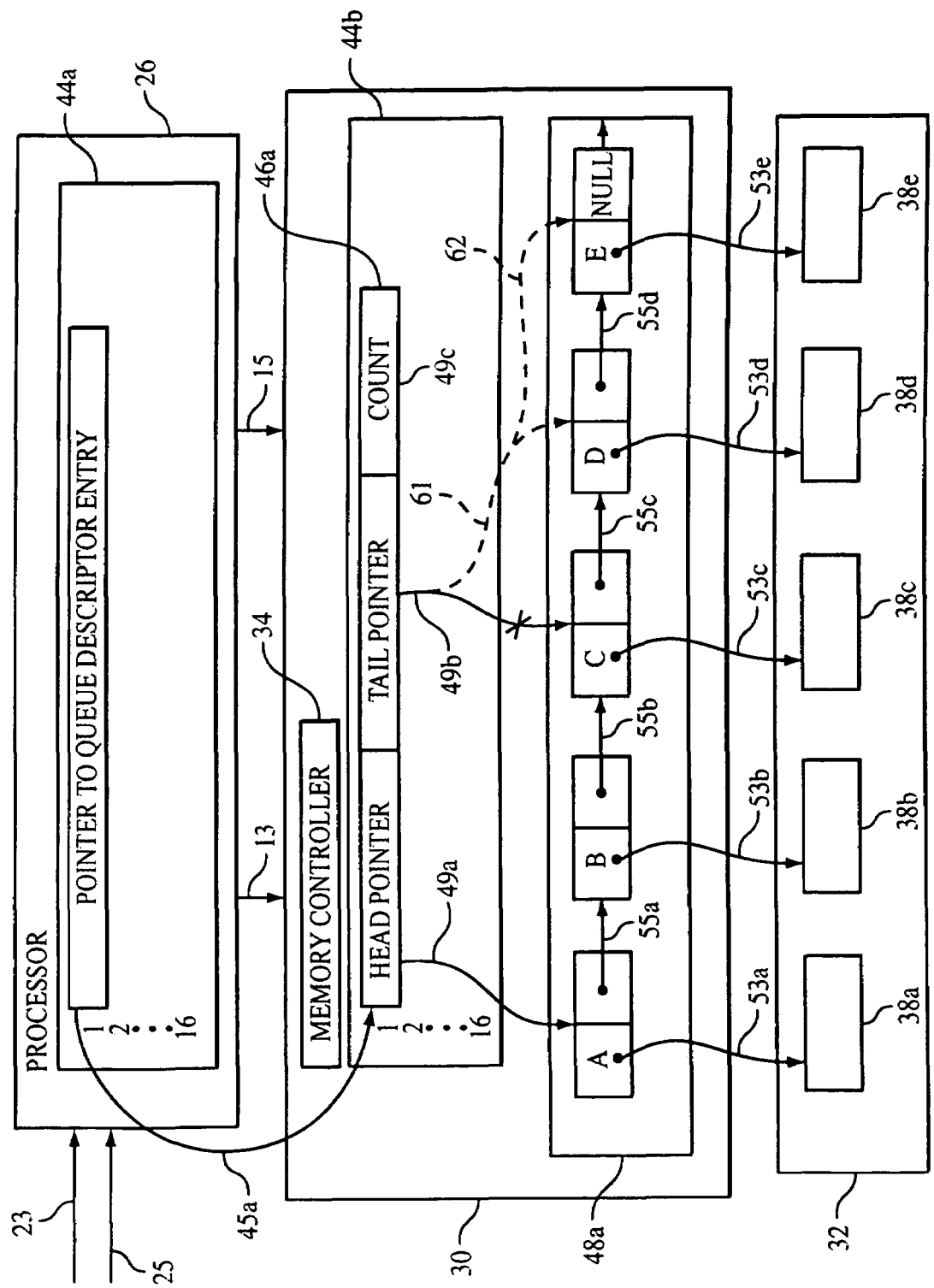

As indicated by FIGS. 4A and 4B, in response to receiving an enqueue request 23, the processor 26 generates 100 an enqueue command 13 directed to the memory controller 34. In this example, the enqueue request 23 is associated with a subsequent data buffer 38*d* received after data buffer 38*c*. The enqueue request 23 includes an identifier specifying the queue descriptor 46*a* and an address associated with the data buffer 38*d* residing in the second memory 32. The tail pointer 49*b* in the queue descriptor 48*a* currently pointing to buffer C is returned to the processor 26. As discussed below with reference to block 110, each enqueue request 23 is evaluated to determine whether the queue descriptor associated with the enqueue request is currently in the data store portion 44*b*. If it is not, then a replacement function is performed.

The buffer pointer 55*c* associated with buffer C currently contains a NULL value (FIG. 3) indicating that it is the last buffer in the queue 48*a*. The buffer pointer 55*c* is set 102 to point to the subsequent buffer D (FIG. 4B). This is accomplished by setting the buffer pointer 55*c* to the address of the buffer D.

Once the buffer pointer 55*c* has been set (block 102), the tail pointer 49*b* is set 104 to point to buffer D as shown by dashed line 61. This also may be accomplished by setting the tail pointer to the address of the buffer D. Since buffer D is now the last buffer in the queue of buffers 48*a*, the value of the buffer pointer 55*d* is set to a NULL value. Moreover, the value in the count field 49*c* is updated to four reflecting the buffers A to D in the queue 48*a*. As a result, the buffer D has been added to the queue 48*a* by using the queue descriptor 46*a* residing in the data store portion 44*b*.

The processor can receive 106 a subsequent enqueue request 23 associated with the same queue descriptor 46*a* and queue 48*a*. Using the example above, it is assumed that the processor 26 receives the enqueue request 23 in connection with a newly arrived data buffer 38*e*. It also is assumed that the data buffer 38*e* is associated with the queue descriptor 46*a*. In that case, the tail pointer 49*b* can be set 108 to point to buffer E which is represented by replacing the dashed line 61 pointing to buffer D with the dashed line 62 pointing to buffer E (FIG. 4B). The tail pointer 49b is updated without having to retrieve it because it is already in the data store portion 44b. As a result, the latency of back-to-back enqueue operations to the same queue of buffers can be reduced.

Suppose, however, that the queue descriptor 46a currently occupying the first entry 1 in the data store portion 44b is not associated with the newly arrived data buffer 38e. In that case, the processor performs 110 a replacement function, which includes removing one of the queue descriptors from the data store portion 44b. For example, the replacement policy can be based on a LRU policy in which a queue descriptor that has not been accessed during a predetermined time period is removed from the data store portion 44b. The removed queue descriptor is written back to the first memory 30 (FIG. 2) and is replaced in the data store portion 44b with the queue descriptor associated with data buffer 38e. Once the replacement function has been completed, queue operations associated with the enqueue request are performed as discussed above.

Figure 5A:
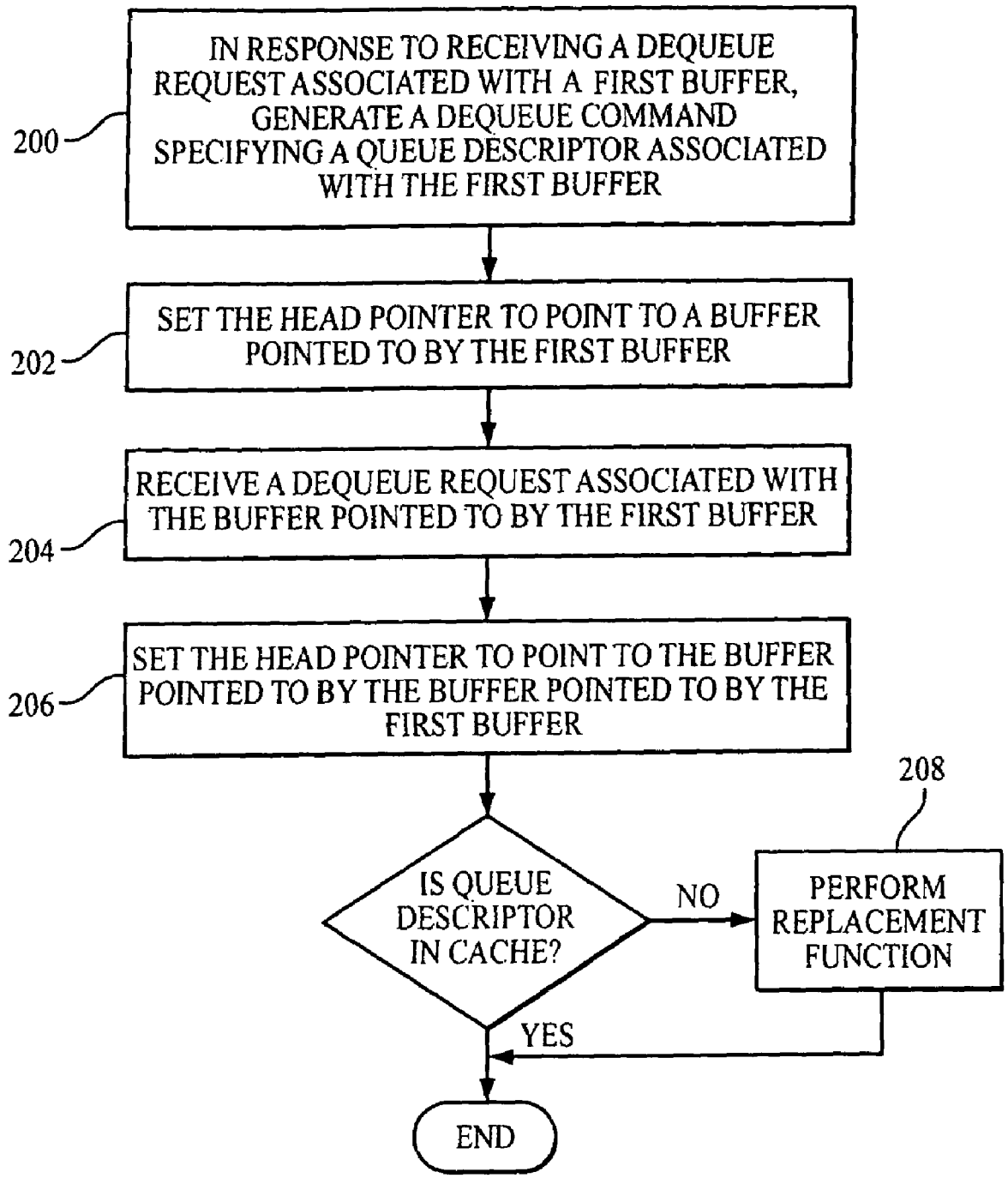
FIGS. 5A and 5B illustrate a dequeue operation.
Figure 5B:
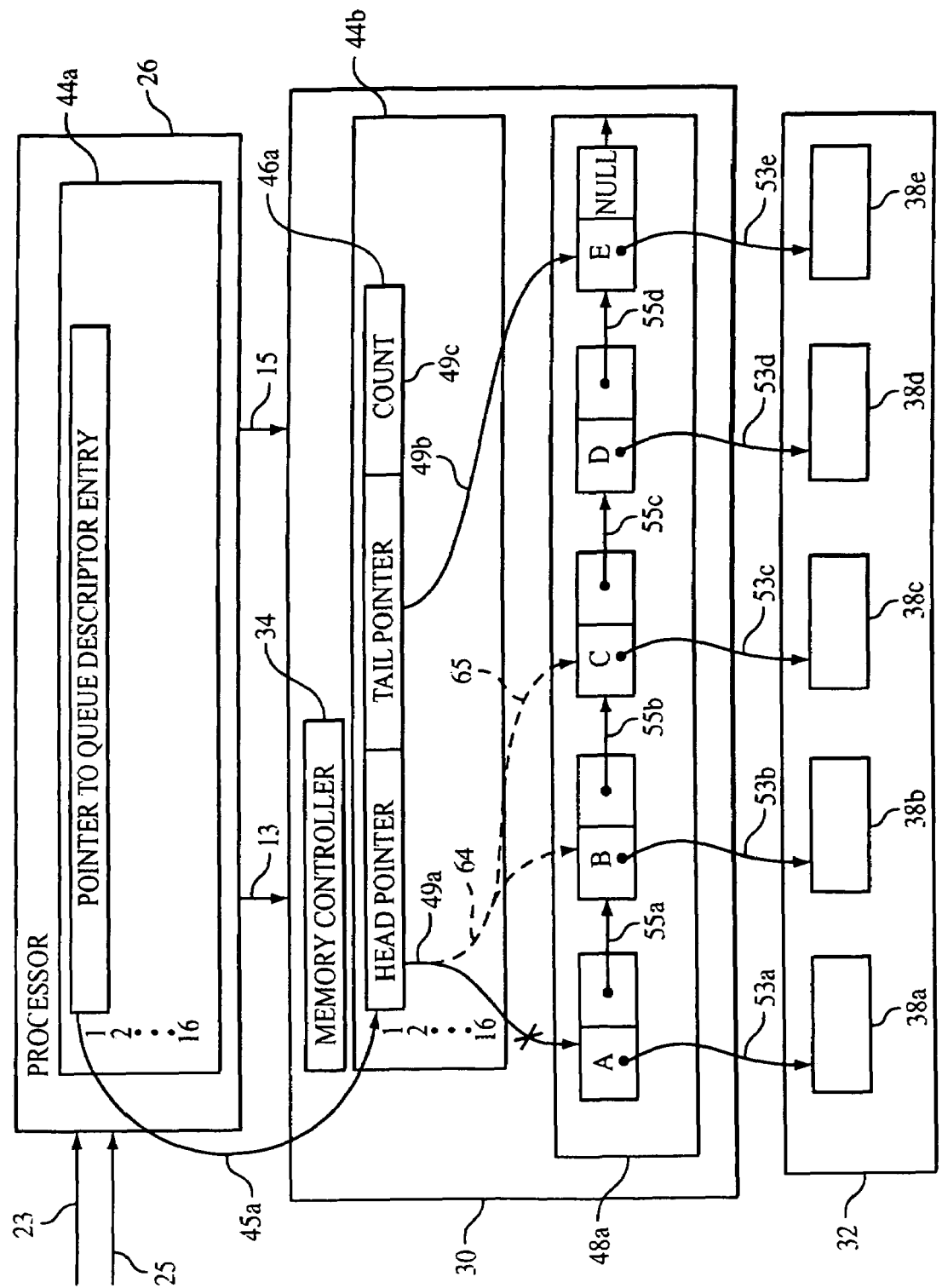

As indicated by FIGS. 5A and 5B, in response to receiving 200 a dequeue request 25, the processor 26 generates 200 a dequeue 15 command directed to the memory controller 34. In this example, the dequeue request 25 is associated with the data buffer 38a residing in the second memory 32. The dequeue request 25 represents a request to retrieve the data buffer 38a from the second memory 32. Once the data buffer 38a is retrieved, it can be transmitted from the second memory 32 to the transmit buffer 36. The dequeue request 25 includes an identifier specifying the queue descriptor 46a and an address associated with the data buffer 38a residing in the second memory 32. The head pointer 49a of the queue descriptor 46a points to the first buffer A which in turn points to data buffer 38a. As a result, the data buffer 38a is returned to the processor 26.

The head pointer 49a is set 202 to point to the next buffer B in the queue 48a as shown by dashed line 64. This is accomplished by setting the head pointer 49a to the address of buffer B. The value in the count field 49c is updated to four reflecting the remaining buffers B to E. Thus, the data buffer 38a is retrieved from the queue 48a using the queue descriptor 46a residing in the data store portion 44b.

The processor 26 can receive 204 subsequent dequeue requests associated with the same queue buffer 48a and the queue descriptor 46a. Continuing the example above, it is assumed that the processor 26 receives a further dequeue request associated with the data buffer B. As discussed above, the head pointer 46a currently points to buffer B (represented by the dashed line 64 in FIG. 5B) which is the first buffer since the reference to buffer A was removed. It also is assumed that the data buffer B also is associated with queue descriptor 46a. In that case, the head pointer 49a can be set 206 to point to buffer C, as shown by a dashed line 65 (FIG. 5B), without having to retrieve the head pointer 49a because it is already in the data store portion 44b. As a result, the latency of back-to-back dequeue operations to the same queue can be reduced.

Suppose, however, that the queue descriptor 46a currently occupying the first entry 1 in the data store portion 44b and the queue descriptor are not associated with the data buffer 38b. In that case, the processor performs 208 a replacement function similar to the one discussed above. Once the replacement function has been completed, operations associated with the dequeue request are performed as previously discussed above.

The cache of queue descriptors 44 can be implemented in a distributed manner such that the tag portion 44a resides in the processor 26 and a data store portion 44b resides in the first memory 30. As a result, data buffers 38 that are received from the receive buffer 20 can be processed quickly. For example, the second of a pair of dequeue commands can be started once the head pointer for that queue descriptor is updated as a result of the first dequeue memory read of the head pointer. Similarly, the second of a pair of enqueue commands can be started once the tail pointer for that queue descriptor is updated as a result of the first enqueue memory read of the tail pointer. In addition, using a queue of buffers, such as a linked list of buffers, allows for a flexible approach to processing a large number of queues. Data buffers can be quickly placed on or removed from the queue of buffers.

Various features of the system can be implemented in hardware, software, or a combination of hardware and software. For example, some aspects of the system can be implemented in computer programs executing on programmable computers. Each program can be implemented in a high level procedural or object-oriented programming language to communicate with a computer system.

Furthermore, each such computer program can be stored on a storage medium, such as read-only-memory (ROM), readable by a general or special purpose programmable computer, for configuring and operating the computer when the storage medium is read by the computer to perform the functions described above.

Other implementations are within the scope of the following claims.

What is claimed is:

1. A method of processing data packets comprising:
receiving an enqueue command specifying a new buffer and a queue descriptor, the queue descriptor specifying one of a most recently used queue and a least recently used queue, with the most recently used queue descriptors each being stored in a cache and comprising a head pointer pointing to a first buffer in a queue of buffers and a tail pointer pointing to a last buffer in the queue of buffers and with the first buffer having a buffer pointer pointing to a next buffer in the queue;
in response to the queue descriptor specifying a most recently used queue, setting a buffer pointer associated with the last buffer in the specified queue to point to the new buffer and setting the tail pointer in the specified queue to point to the new buffer; and
in response to the queue descriptor specifying a least recently used queue, replacing a most recently used queue descriptor in the cache with the queue descriptor specifying the least recently used queue.

2. The method of claim 1 further comprising:
receiving a second enqueue command specifying a second new buffer; and
in response to a queue descriptor of the second enqueue command specifying the same specifiec queue, setting the tail pointer of the specifiec queue to point to the second buffer.

3. The method of claim 1 further comprising:
receiving a dequeue command specifying a most recently used queue descriptor; and
setting the head pointer of the descriptor of the queue specified in the dequeue command to point to a next buffer in the queue specified in the dequeue command.

4. The method of claim 3 further comprising:
receiving a second dequeue command specifying the same queue specified in the dequeue command; and
setting the head pointer of the descriptor of the specified queue to point to a buffer pointed to by the next buffer in the specified queue.

5. An apparatus for processing data packets comprising:
at least one memory comprising:
- a collection of queues of one or more buffers, each queue having a first buffer with a buffer pointer pointing to a next buffer in the queue,
- a collection of most recently used queue descriptors, each of which comprises a head pointer pointing to the first buffer in a corresponding queue and a tail pointer pointing to a last buffer in the corresponding queue, and
- a collection of least recently used queue descriptors, each of which comprises a pointer pointing to a corresponding queue;

a processor coupled to the at least one memory; and a computer-readable medium storing instructions that, when applied to the processor, cause the processor to generate an enqueue command to the at least one memory specifying a new buffer and one or more of a most recently used queue descriptor and a least recently used queue descriptor, wherein, in response to the enqueue command specifying a most recently used queue descriptor, a buffer pointer associated with the last buffer of the specified queue is set to point to the new buffer, and the tail pointer of the specified queue is set to point to the new buffer, and in response to the enqueue command specifying a least recently used queue descriptor, a most recently used queue descriptor is replaced in the collection of most recently used queue descriptors with the specified least recently used queue descriptor.

6. The apparatus of claim 5 wherein, in response to a second enqueue command specifying a second new buffer and the most recently used queue descriptor, a current tail pointer is set to point to the second new buffer.

7. The apparatus of claim 5 wherein the processor is further configured to:
generate a dequeue command specifying a most recently used queue descriptor,
wherein, in response to the dequeue command, the head pointer is set to point the next buffer after the first buffer of the queue specified by the most recently used queue descriptor.

8. The apparatus of claim 7 wherein, in response to a second dequeue command, the head pointer is set to point to a buffer pointed to by the next buffer.

9. The apparatus of claim 5 wherein each buffer in the queues specified by the most recently used queue descriptors includes pointers to data buffers having data packets residing in a second memory.

10. The apparatus of claim 5 wherein the collection of most recently used queue descriptors includes approximately 16 queue descriptors.

11. The apparatus of claim 5 wherein each most recently used queue descriptor includes a count field having a value representing the number of buffers in the queue.

12. The apparatus of claim 5 wherein the queues each comprise a linked list of buffers.

13. A system comprising:
a source of data packets to be grouped into data buffers;
a destination for the data packets; and
an apparatus coupled to the source of the data packets and to the destination of the data packets, the apparatus comprising:
at least one memory comprising:
- a collection of queues of one or more buffers, each queue having a first buffer with a buffer pointer pointing to a next buffer in the queue,
- a collection of most recently used queue descriptors, each of which comprises a head pointer pointing to the first buffer in a corresponding queue and a tail pointer pointing to a last buffer in the corresponding queue, and
- a collection of least recently used queue descriptors, each of which has a pointer pointing to a corresponding queue;

a processor coupled to the at least one memory; and
a computer-readable medium storing instructions that, when applied to the processor, cause the processor to generate an enqueue command to the at least one memory specifying a new buffer and one or more of a least recently used queue descriptor and a most recently used queue descriptor, wherein, in response to the enqueue command specifying a most recently used queue descriptor, a buffer pointer associated with the last buffer of the specified queue is set to point to the new buffer, and the tail pointer of the specified queue is set to point to the new buffer, and in response to the enqueue command specifying a least recently used queue descriptor, a most recently used queue descriptor is replaced in the collection of most recently used queue descriptors with the specified least recently used queue descriptor.

14. The system of claim 13 wherein, in response to a second enqueue command specifying a second new buffer and the most recently used queue descriptor, a current tail pointer is set to point to the second new buffer.

15. The system of claim 13 wherein the processor is further configured to:
generate a dequeue command specifying a most recently used queue descriptor,
wherein, in response to the dequeue command, the head pointer is set to point to the next buffer after the first buffer of the queue specified by the most recently used queue descriptor.

16. The system of claim 15 wherein, in response to a second dequeue command, the head pointer is set to point to a buffer pointed to by the next buffer.

17. The system of claim 13 wherein each buffer in the queues specified by the most recently used queue descriptors includes pointers to data buffers containing data packets residing in a second memory.

18. The system of claim 13 wherein the collection of most recently used queue descriptors includes approximately 16 queue descriptors.

19. The system of claim 13 wherein each most recently used queue descriptor includes a count field having a value representing the number of buffers in the queue.

20. The system of claim 13 wherein the queues each comprise a linked list of buffers.

21. The system of claim 13, wherein the processor comprises a cache to store a set of pointers to corresponding queue descriptors in the at least one memory.

22. The apparatus of claim 5, wherein the processor comprises a cache to store a set of pointers to corresponding queue descriptors in the at least one memory.

* * * * *